(12) United States Patent
Gorelik et al.

(10) Patent No.: US 9,336,246 B2
(45) Date of Patent: May 10, 2016

(54) GENERATING COMPOSITE KEY RELATIONSHIPS BETWEEN DATABASE OBJECTS BASED ON SAMPLING

(75) Inventors: Alexander Gorelik, Palo Alto, CA (US); Sharad Santhanam, Mountain View, CA (US); Lev M. Tsentsiper, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 13/406,974

(22) Filed: Feb. 28, 2012

(65) Prior Publication Data
US 2013/0226940 A1     Aug. 29, 2013

(51) Int. Cl.
*G06F 17/30*     (2006.01)

(52) U.S. Cl.
CPC .............................. *G06F 17/30292* (2013.01)

(58) Field of Classification Search
None
See application file for complete search history.

(56) References Cited

U.S. PATENT DOCUMENTS

| | | | |
|---|---|---|---|
| 6,272,487 B1 | 8/2001 | Beavin et al. | |
| 6,405,187 B1 | 6/2002 | Egan et al. | |
| 6,529,901 B1 | 3/2003 | Chaudhuri et al. | |
| 6,957,225 B1 | 10/2005 | Zait et al. | |
| 6,993,516 B2 | 1/2006 | Haas et al. | |
| 7,047,230 B2 * | 5/2006 | Gibbons ....................... | 707/600 |
| 7,127,457 B1 | 10/2006 | Ghazal | |
| 7,277,873 B2 | 10/2007 | Brown et al. | |
| 7,610,272 B2 | 10/2009 | Zurek | |
| 7,647,293 B2 | 1/2010 | Brown et al. | |
| 7,685,086 B2 | 3/2010 | Brown et al. | |
| 8,453,173 B1 * | 5/2013 | Anderson et al. ............... | 725/35 |
| 2004/0128290 A1 | 7/2004 | Haas et al. | |
| 2004/0193629 A1* | 9/2004 | Mozes ........................ | 707/100 |
| 2005/0055369 A1 | 3/2005 | Gorelik et al. | |
| 2005/0055673 A1 | 3/2005 | Dias et al. | |
| 2005/0278357 A1 | 12/2005 | Brown et al. | |
| 2006/0074875 A1 | 4/2006 | Faunce et al. | |
| 2006/0116984 A1 | 6/2006 | Zurek | |
| 2006/0184572 A1 | 8/2006 | Meek et al. | |

(Continued)

OTHER PUBLICATIONS

Johnson, G.; "IBM InfoSphere Discovery: The Power of Smarter Data Discovery"; IBM Corporation; www.mdug.org/presentation/discovery; 2011, 33 pages.

(Continued)

*Primary Examiner* — Alex Gofman
*Assistant Examiner* — Umar Mian
(74) *Attorney, Agent, or Firm* — Mohammed Kashef; Edell, Shapiro & Finnan, LLC

(57) ABSTRACT

According to one embodiment of the present invention, a system determines key relationships between database tables and includes a computer system including at least one processor. The system determines a sampling range for one or more matching columns between first and second database tables. The matching columns satisfy one or more matching criteria and the sampling range is based on quantities of distinct values within the matching columns. Data is sampled from the first and second database tables in accordance with the sampling ranges to determine a sample set. Keys between the first and second database tables are determined based on matching between columns within the sample set. Embodiments of the present invention further include a method and computer program product for determining key relationships between database tables in substantially the same manner described above.

12 Claims, 4 Drawing Sheets

(56) References Cited

U.S. PATENT DOCUMENTS

| | | |
|---|---|---|
| 2007/0011143 A1 | 1/2007 | Fuh et al. |
| 2007/0143314 A1 | 6/2007 | Thomsen |
| 2007/0233648 A1 | 10/2007 | Zuzarte |
| 2007/0282784 A1 | 12/2007 | Modani et al. |
| 2008/0027907 A1 | 1/2008 | Brown et al. |
| 2009/0083215 A1* | 3/2009 | Burger ............................ 707/2 |
| 2009/0094274 A1* | 4/2009 | Gorelik et al. ............... 707/102 |
| 2009/0193006 A1 | 7/2009 | Hermstadt |
| 2010/0030809 A1* | 2/2010 | Nath ........................ 707/104.1 |
| 2010/0174702 A1 | 7/2010 | Au et al. |
| 2011/0208748 A1* | 8/2011 | Chaudhuri et al. ........... 707/748 |
| 2012/0084287 A1 | 4/2012 | Lakshminarayan et al. |
| 2012/0317134 A1 | 12/2012 | Bourbonnais et al. |
| 2013/0024430 A1* | 1/2013 | Gorelik ........................ 707/690 |
| 2014/0012819 A1 | 1/2014 | Gorelik |
| 2015/0006542 A1 | 1/2015 | Gorelik |

OTHER PUBLICATIONS

C.A. Erwin; "Combining Data Profiling and Data Modeling for Better Data Quality"; Transforming IT Management, Technology Brief; erwin.com/whitepapers/detail/combin . . . ; 2009, 10 pages.

Gorelik, A.; "IBM InfoSphere Discovery: The Next Generation of data Analysis"; IBM Corporation; www.ibm.com/developerworks/data; Jun. 17, 2010, 20 pages.

* cited by examiner

GENERATING COMPOSITE KEY RELATIONSHIPS BETWEEN DATABASE OBJECTS BASED ON SAMPLING

BACKGROUND

1. Technical Field

Present invention embodiments relate to determining key relationships between database objects, and more specifically, to determining composite keys between database objects based on a sampled data set of the database objects.

2. Discussion of the Related Art

A composite primary-foreign key relationship for database tables S (having columns C1, C2, C3, C4, ... Cn) and T (having columns D1, D2, D3, D4, ... Dm) is a subset of the columns from database tables S and T subject to the following conditions. Initially, the subset of columns (Ci, Cj, Ck, ... Cr) from database table S compounded together is a primary key for database table S. The selectivity of the subset of columns (forming the primary key) is high (ideally 100%). In other words, the column subset (forming the primary key) on the primary database table S has distinct values for every row, or most rows, of database table S.

Further, for every row in database table T, there is a corresponding row in database table S that has corresponding values (i.e., Ci=Da, Cj=Db, Ck=Dc ... Cr=Df). In other words, the foreign hit rate of a composite key (for a primary-foreign key relationship) is high (ideally 100%).

The composite key relationships are generated by executing Structured Query Language (SQL) queries repeatedly on the entire database tables and analyzing the query results. However, since this approach is time consuming and does not scale, users can only discover these relationships between smaller database tables, or are required to manually create sample sets from larger database tables. Datasets with larger database tables (greater than one million rows) are routine, and for these datasets, it is very difficult to generate the relationships accurately and without copious amounts of manual work.

BRIEF SUMMARY

According to one embodiment of the present invention, a system determines key relationships between database tables and includes a computer system including at least one processor. The system determines a sampling range for one or more matching columns between first and second database tables. The matching columns satisfy one or more matching criteria and the sampling range is based on quantities of distinct values within the matching columns. Data is sampled from the first and second database tables in accordance with the sampling ranges to determine a sample set. Keys between the first and second database tables are determined based on matching between columns within the sample set. Embodiments of the present invention further include a method and computer program product for determining key relationships between database tables in substantially the same manner described above.

DETAILED DESCRIPTION

Present invention embodiments determine composite primary-foreign key relationships between database tables based on sampling of the database table data. The rows of the database tables are sampled, where the sampled rows are utilized to discover composite key relationships. The sampling is performed in a manner to preserve relationships that are present between the database tables. Structured Query Language (SQL) queries are applied to the resulting sampled data set, as opposed to the full data set of the database tables, thereby resulting in significant performance gains.

Figure 1:
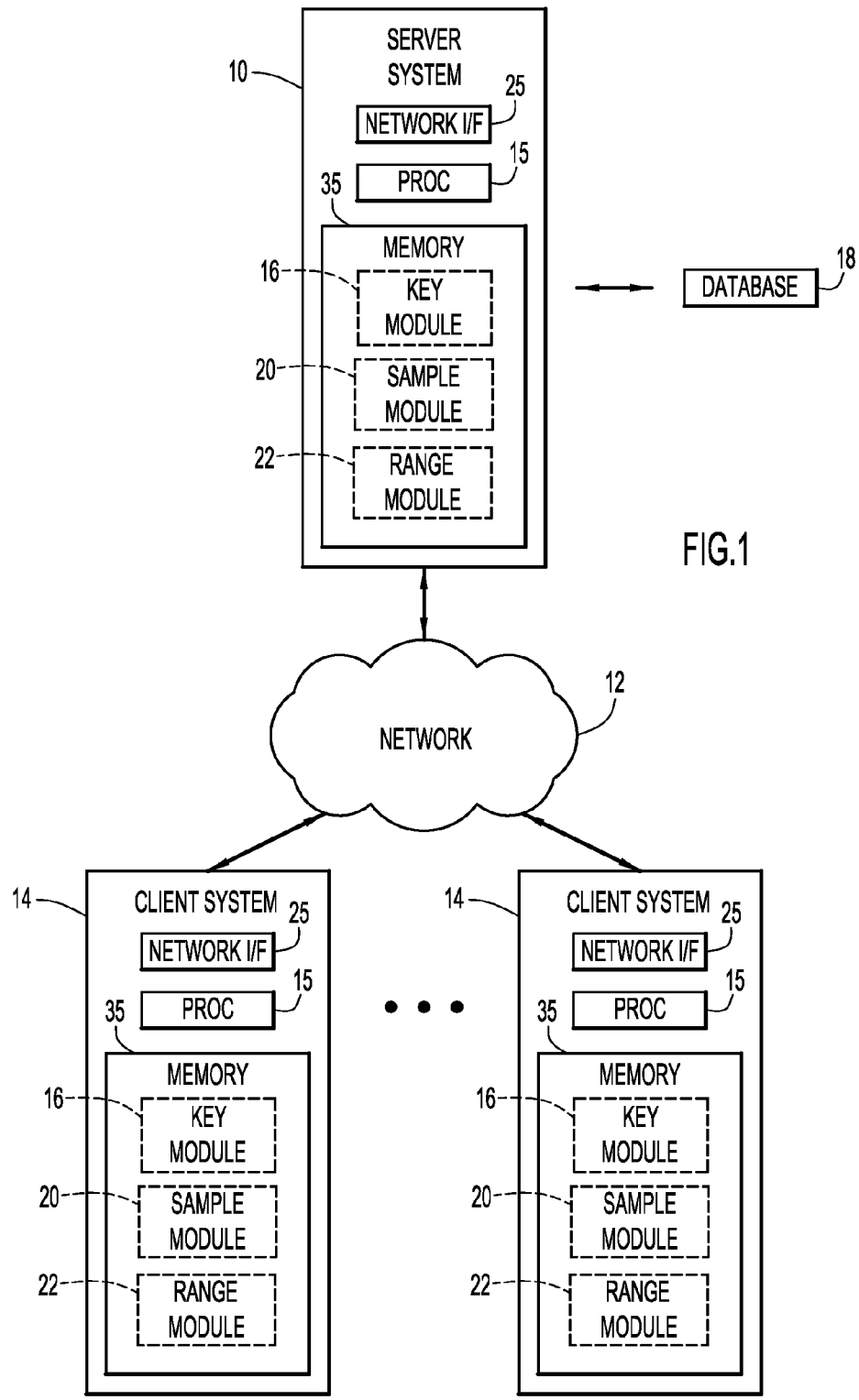
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 perform the generation of composite key relationships between database objects, while server systems 10 provide information (e.g., metadata, database table data, frequencies for keys, ranges, etc.) to the client systems for the key generation. In other words, the key generation is preferably implemented as a client application, where one or more client systems 14 may perform the key generation on respective sets of database tables.

Client system 14 includes a key module 16 to generate the composite key relationships, a sample module 20 to sample the database objects and produce a sampled data set, and a range module 22 to determine range values for the sampling. A database system 18 may store various information for the key generation (e.g., metadata, database table data, frequencies for keys, ranges, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). Client system 14 may present a graphical user (e.g., GUI, etc.) or other interface (e.g., command line prompts, menu screens, etc.) to solicit information from users pertaining to the composite key generation (e.g., desired database objects, parameter values, etc.), and may provide reports including key generation results (e.g., generated keys, parameter values, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and/or custom software (e.g., server/communications software, key module, sample module, range module, browser/interface software, etc.).

Alternatively, one or more server systems 10 may perform the key generation, and provide results to the client systems. In other words, the key generation may be implemented as a server application. In this case, server system 10 stores or has access to the data (e.g., metadata, database table data, frequencies for keys, ranges, etc.), and includes key module 16, sample module 20, and range module 22 to perform the key generation. The graphical user (e.g., GUI, etc.) or other interface (e.g., command line prompts, menu screens, etc.) of the client system solicits information from a corresponding user pertaining to the key generation (e.g., desired database objects, parameter values, etc.) for transference to the server system, and may provide reports including key generation results received from the server system (e.g., generated keys, parameter values, etc.).

Key module 16, sample module 20, and range module 22 may include one or more modules or units to perform the various functions of present invention embodiments described below. The various modules (e.g., key module, sample module, range module, etc.) may be implemented by any combination of any quantity of software and/or hardware modules or units, and may reside within memory 35 of the server and/or client systems for execution by processor 15.

Figure 2:
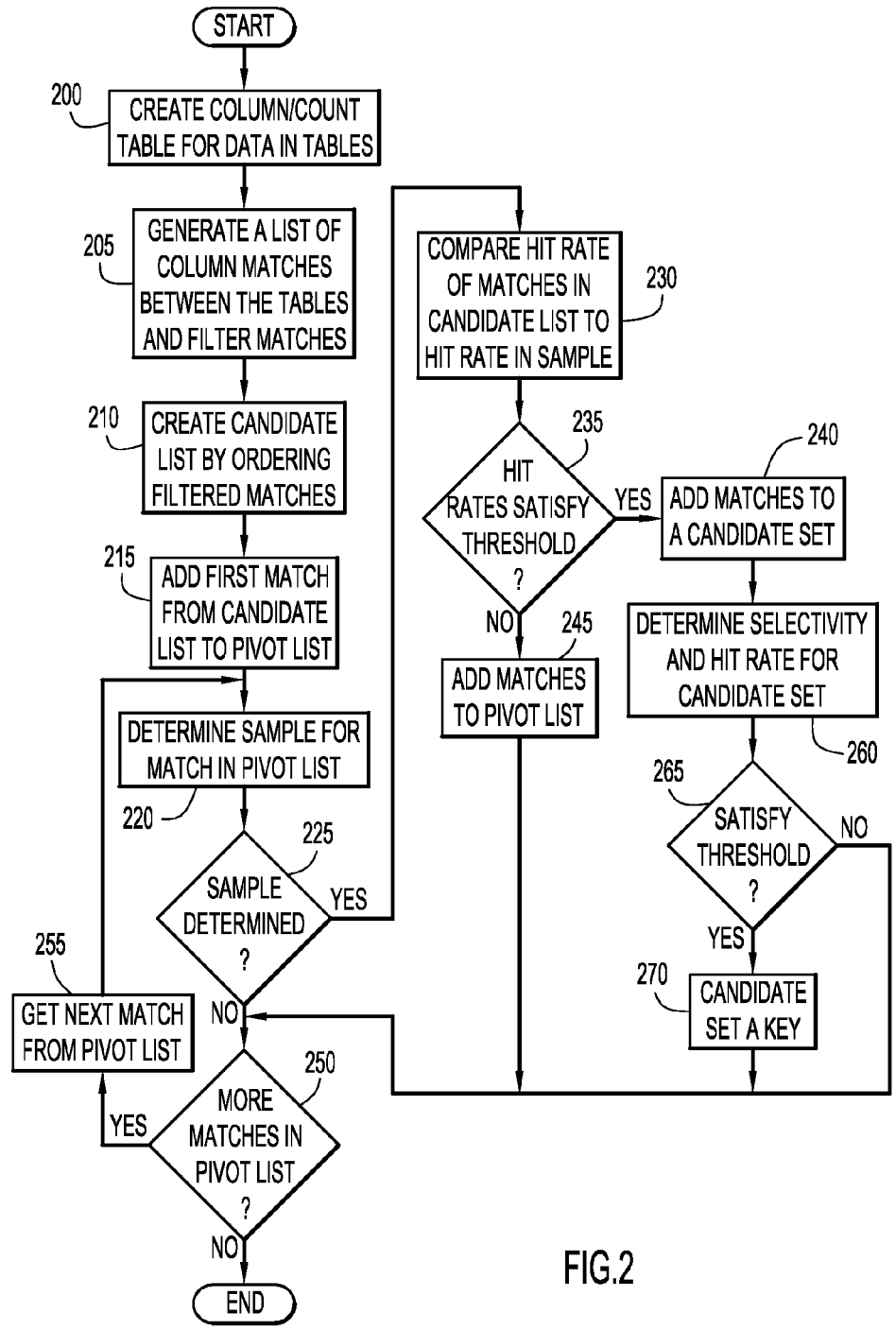
FIG. 2 is a procedural flowchart illustrating a manner of generating key relationships between database tables according to an embodiment of the present invention.

A manner of generating key relationships (e.g., via key module 16 and server system 10 and/or client system 14) between a primary database table and a foreign database table according to an embodiment of the present invention is illustrated in FIG. 2. By way of example, the primary database table contains the primary key, while the foreign database table has the column corresponding to the foreign portion of the key relationship. Initially, the data of the primary and foreign database tables is analyzed at step 200 to determine the distinct values within a database table column, and the number of times the distinct value appears in that column. This information is determined for each column of the primary and foreign database tables and stored in a profiling database table (e.g., within database system 18).

Once the profiling database table is created, the profiling database table is analyzed to determine a list of column matches at step 205. A column match is a relationship between columns of the primary and foreign database tables that each contain the same or nearly the same set of values. In order for a column match to be valid, the matching columns should have identical values for a threshold quantity of database table rows. In other words, the relationship of a column value of a primary database table S being equal to a corresponding column value of a foreign database table T (e.g., S.C1=T.D2) should have a foreign hit rate (e.g., a quantity of rows within the foreign database table where each of these rows has a corresponding row in the primary database table with a matching column value; typically expressed as a percentage of the total rows within the foreign database table) above a match threshold, where this threshold is preferably configurable.

Once the column matches are determined, the column matches are further filtered at step 205. In particular, column matches that produce a perfect foreign hit rate (e.g., 100% foreign hit rate and 100% selectivity within the primary database table (e.g., a ratio of the quantity of unique values within a column to the quantity of rows within the primary database table, where 100% selectivity generally refers to retrieval of a single row for a column value)), a foreign hit rate that is below a hit rate threshold, or selectivity ratios (e.g., selectivity within the primary database table) that are greater than a selectivity threshold are discarded. These various thresholds may each be configurable.

The filtered column matches are arranged in decreasing order of selectivity to produce a candidate matches list at step 210. The first match in the candidate matches list is placed in a pivot list at step 215, and a sampled data set is determined for the first match (e.g., via sample module 20 and server system 10 and/or client system 14) at step 220. The sampled data set includes data sampled from the primary and foreign database tables as described below.

If the sampled data set is unable to be produced as determined at step 225 (e.g., indicated by a null data set or other indicator provided by sample module 20 as described below), the next column match in the pivot list is retrieved at step 255 for the above sampling process (e.g., commencing at step 220) in response to the presence of additional column matches in the pivot list as determined at step 250.

When the sampled data set is produced as determined at step 225 (e.g., indicated by a sampled data set (or reference to a sampled data set) provided by sample module 20 as described below), the foreign hit rates of all the column matches in the candidate matches list for the full data set (e.g., full primary and foreign database tables) are compared with their corresponding foreign hit rates in the sampled data set (e.g., sampled primary and foreign database tables) at step 230. The selectivity and foreign hit rates for the column matches within the sampled data set (e.g., sampled primary and foreign database tables) are determined and preferably stored in a global structure for key relationship analysis as described below. The column matches with insufficient foreign hit rates as determined at step 235 are placed in the pivot list at step 245 for further processing. The next column match in the pivot list is retrieved at step 255 for the above sampling process (e.g., commencing at step 220) in response to the presence of additional column matches in the pivot list as determined at step 250.

When the foreign hit rates of the column matches within the sampled data set (e.g., sampled primary and foreign database tables) are within a certain percentage (e.g., 20%) of their original foreign hit rates in the full data set (e.g., full primary and foreign database tables) as determined at step 235, the column matches with the sufficient hit rates are placed in a new candidate set at step 240. The selectivity (within the primary database table) and foreign hit rate for a key represented by the candidate set (e.g., the key including a concatenation of the primary database table columns within the candidate set generated at step 240) are determined for the sampled data set (e.g., sampled primary and foreign database tables) at step 260. Since a global structure is maintained for storing the selectivity and foreign hit rates for candidate matches (e.g., step 230) within the sampled data set, the selectivity and foreign hit rates are preferably based on all of the determined samples from the primary and foreign database tables. However, the selectivity and foreign hit rates may be determined from the full data set (e.g., full primary and foreign database tables) when more accurate results are desired.

If the selectivity and foreign hit rate for the candidate set exceed corresponding key thresholds for selectivity and foreign hit rate as determined at step 265, the candidate set provides a key relationship, and the represented key is stored in database system 18 at step 270. The determination of the selectivity and foreign hit rate for the candidate set can be done quite efficiently since all the sampled rows from the primary and foreign database tables are already loaded in memory, and in-memory indexes have been created during production of the sampled data set.

Once the represented key is stored at step 270, or when the candidate set does not satisfy the selectivity and foreign hit rate thresholds as determined at step 265, the next column match in the pivot list is retrieved at step 255 for the above sampling process (e.g., commencing at step 220) in response to the presence of additional column matches in the pivot list as determined at step 250.

The above process (e.g., commencing at step 220) is performed for remaining column matches in the pivot list until each column match in the pivot list has been processed and considered for sampling as determined at step 250.

Figure 3:
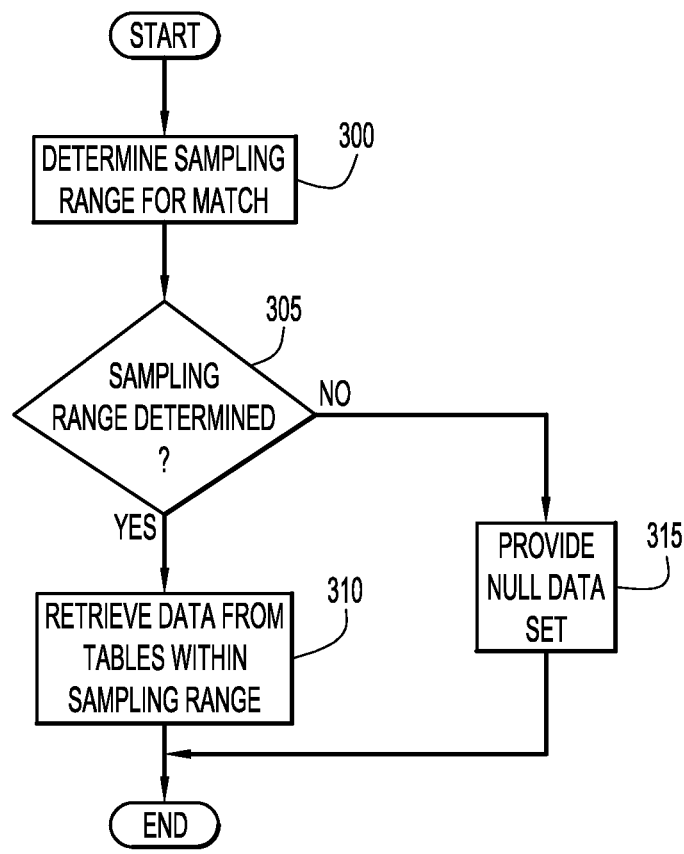
FIG. 3 is a procedural flowchart illustrating a manner of producing a sampled data set according to an embodiment of the present invention.

A manner of producing a sampled data set (e.g., via sample module 20 and server system 10 and/or client system 14) is illustrated in FIG. 3. Initially, a sampled data set (e.g., including data sampled from the primary and foreign database tables) is produced for a column match (between the primary and foreign database tables) retrieved from the pivot list as described above. Specifically, a sampling range for the column match is determined (e.g., via range module 22 and server system 10 and/or client system 14) at step 300. The sampling range includes minimum and maximum values for the matching columns to indicate a range of rows from the primary and foreign database tables to retrieve in order to form the sampled data set.

When the sampling range is provided as determined at step 305 (e.g., as indicated by maximum and minimum column values provided by range module 22 described below), the data from the primary and foreign database tables corresponding to the sampling range is loaded into memory to produce the sampled data set at step 310. A reference to the sampled data set is preferably provided in order to enable access to the sampled data set. The sampled data may be retrieved from the primary and foreign database tables based on database queries including the sampling range. Example query (SQL) structures to retrieve the sampled data from the primary and foreign database tables based on the sampling range may be as follows.

SELECT C1, C2, C3, . . . Cm FROM S WHERE S.C1 BETWEEN V1 and V2 (for a primary database table S), and
SELECT D1, D2, D3, . . . Dm FROM T WHERE T.D1 BETWEEN V1 and V2 (for a foreign database table T);

where S is the primary database table with columns C1 to Cm, S.C1 represents column C1 in primary database table S, T is the foreign database table with columns D1 to Dm, T.D1 represents column D1 in foreign database table T, and V1 and V2 represent the minimum and maximum values indicating the sampling range (or range of values for the matching columns). The columns specified within the queries (e.g., C1 to Cm and D1 to Dm) are exactly the same as those in the candidate matches list described above.

If the sampling range is unable to be generated as determined at step 305 (e.g., indicated by a response from range module 22 described below), a null data set or other indicator is provided at step 315.

Figure 4:
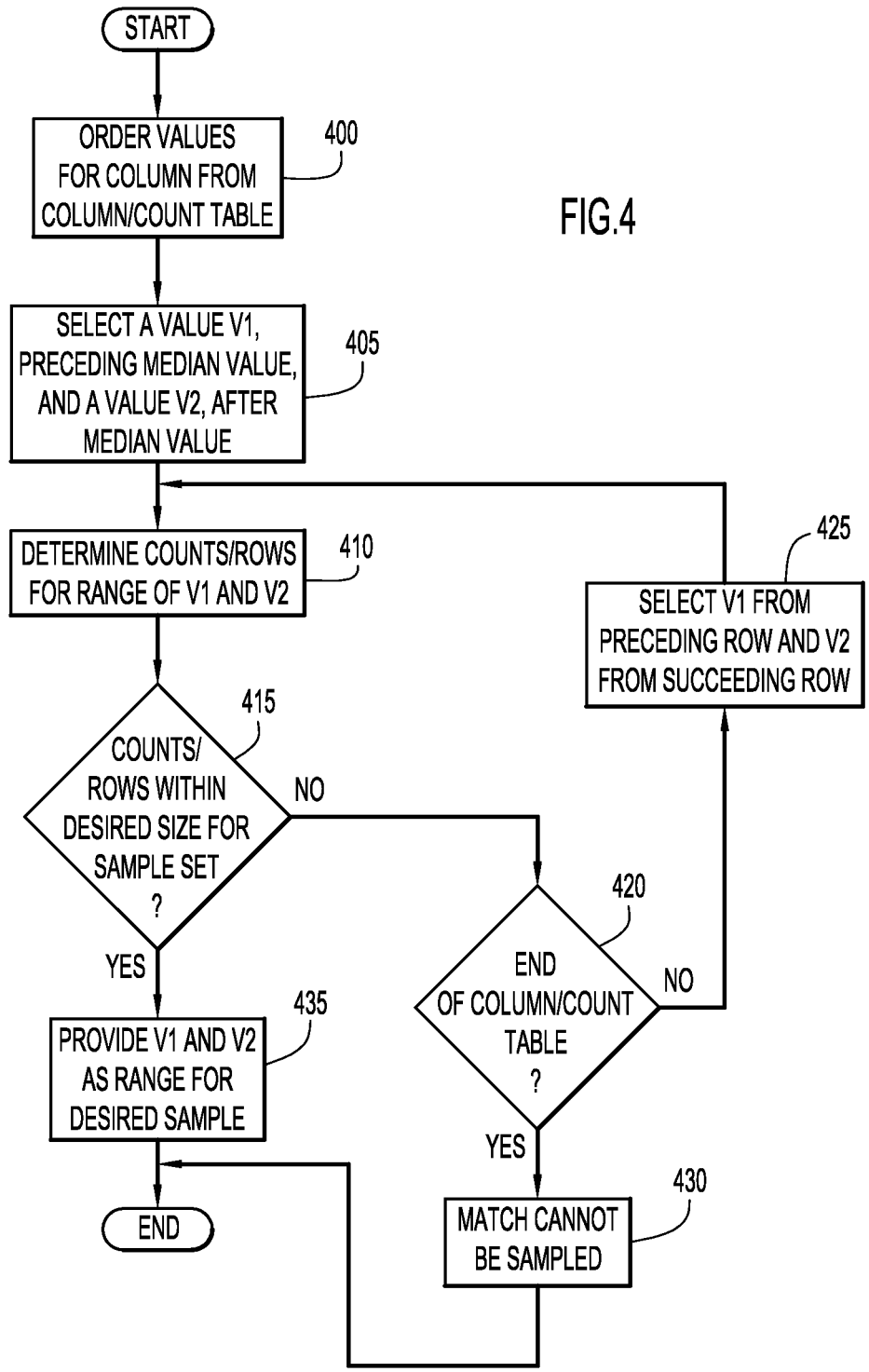
FIG. 4 is a procedural flowchart illustrating a manner of determining a sampling range for producing a sampled data set according to an embodiment of the present invention.

A manner of determining a sampling range to produce a sampled data set from the primary and foreign database tables (e.g., via range module 22 and server system 10 and/or client system 14) is illustrated in FIG. 4. Initially, a sampling range is produced for a column match (between the primary and foreign database tables) retrieved from the pivot list as described above (FIGS. 2 and 3). A minimum value, V1, and a maximum value, V2, are determined to produce a relatively small set of rows (e.g., approximately 1000 to 2000 rows) from both the primary and foreign database tables (e.g., where the values for matching columns from the primary and foreign database tables are between V1 and V2, or V1<=S.C1 (=T.D2)<=V2) for the sampled data set. However, if the primary and/or foreign database tables are small enough, the entire primary and/or foreign database table may be loaded into memory, thereby bypassing use of sampling (e.g., V1 and V2 restrictions may be dropped altogether).

In particular, the distinct values for a primary database column of the column match within the profiling database table (FIG. 2) are arranged in order (e.g., numeric, lexicographic, or other order depending on the type of column data) to form a set of ordered column values at step 400. A median column value is determined, where the median column value is the value positioned at the approximate middle or center position within the ordered set. For example, if the ordered set includes eleven data elements, the median value is the column value positioned at the sixth position in the ordered set. This applies for all types of data (e.g., numeric, strings, etc.). The value preceding the median column value in the ordered set is selected as an initial value for the minimum value, V1, while the value following the median value in the ordered set is selected as an initial value for the maximum value, V2, at step 405.

The corresponding counts for the median column value and the selected column values, V1 and V2, are determined from the profiling database table (e.g., from the counts for the primary database table), and combined to determine a total count for these values at step 410. The total count basically represents the quantity of rows within the primary database table containing the selected range of column values. Since the row counts for the foreign database table should not be significantly different than those of the primary database table, the counts for the primary database table are preferably utilized to produce the sampling range. However, in some cases, the counts for the foreign database table, or for both the primary and foreign database tables may be utilized. The total count, C, may be represented by the following expression, where the total count is initialized to the count of the median column value (e.g., C=<Distinct Count of median column value>).

$$C = C + <\text{Distinct Count of Value } V1> + <\text{Distinct count of value } V2>.$$

When the total count is less than the size threshold (e.g., indicating a minimum size for data from each of the primary and foreign database tables for the sampled data set (e.g., 2000 rows)) as determined at step 415, the minimum value, V1, is adjusted to the preceding value in the ordered set, while the maximum value, V2, is adjusted to the succeeding value in the ordered set at step 425 in response to the presence of additional values in the ordered set as determined at step 420. The above process is repeated (e.g., commencing at step 410) until the total count exceeds the size threshold as determined at step 415 or the values in the ordered set have been exhausted as determined at step 420, where the total count is incremented by the counts for the new minimum and maximum values, V1 and V2. When the total count is less than the size threshold and no additional preceding or succeeding values exist in the ordered set as determined at step 420, the column match cannot be sampled, and an indication indicating this condition is provided at step 430.

When the total count is greater than the size threshold as determined at step 415, the selected column values, V1 and V2, are provided as the sampling range at step 435. These values are utilized for both the primary and foreign database tables to retrieve data for the sampled data set. However, respective sets of the selected column values, V1 and V2, may be determined for each of the primary and foreign database tables based on the counts for these database tables in the profiling database table in substantially the same manner described above.

It will be appreciated that the embodiments described above and illustrated in the drawings represent only a few of the many ways of implementing embodiments for generating composite key relationships between database objects based on sampling.

The environment of the present invention embodiments may include any number of computer or other processing systems (e.g., client systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, key module, sample module, range module, etc.). These systems may include any types of monitors and input devices (e.g., keyboard, mouse, voice recognition, etc.) to enter and/or view information.

It is to be understood that the software (e.g., key module, sample module, range module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., key module, sample module, range module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., metadata, database table data, frequencies for keys, ranges, etc.). The database system may be implemented by any number of any conventional or other databases, data stores or storage structures (e.g., files, databases, data structures, data or other repositories, etc.) to store information (e.g., metadata, database table data, frequencies for keys, ranges, etc.). The database system may be included within or coupled to the server and/or client systems. The database systems and/or storage structures may be remote from or local to the computer or other processing systems, and may store any desired data (e.g., metadata, database table data, frequencies for keys, ranges, etc.). Further, the various database tables and structures (e.g., primary database table, foreign database table, profiling database table, global structure, etc.) may be implemented by any conventional or other data structures (e.g., files, arrays, lists, stacks, queues, etc.) to store information, and may be stored in any desired storage unit (e.g., database, data or other repositories, etc.).

The criteria to determine column matches may be based on any quantity of any types of criteria (e.g., selectivity, hit rate, cardinality, etc.). The column matches may be filtered based on any quantity of any characteristics (e.g., selectivity, hit rate, cardinality, etc.), where the characteristics may be compared against corresponding thresholds of any desired values (e.g., hit rate percentages, selectivity percentages, etc.). The various thresholds and parameters (e.g., hit rate, selectivity, key, size, etc.) may be set to any suitable values (e.g., to control a quantity of column matches, sensitivity to identifying key relationships and/or candidate sets, size of the sampled data from database tables, etc.) and applied in any fashion (e.g., greater/less than, equal, etc.). The criteria to determine a candidate set or key relationship may be based on any quantity of any types of criteria (e.g., selectivity, hit rate, cardinality, etc.) applied to the full and/or one or more sets of sampled data. The various lists or sets (e.g., pivot, candidate match list, candidate set, etc.) may include any names or labels, and may be any quantity of any type of data or other structures (e.g., list, array, etc.).

The sampling range may be based on any desired statistical or other formulations (e.g., median, mean, etc.). The column values within a set may be traversed in any desired order or increment (e.g., one or more preceding or subsequent values, etc.) to determine the minimum and maximum values for the sampling range. The set of minimum and maximum values may be applied to one or more database tables to produce the sampled data set. Alternatively, any quantity of sets of minimum and maximum values may be determined and applied to one or more database tables to produce the sampled data set. The counts may be based on the counts for any combination of one or more database tables (e.g., primary, foreign, any combination of these tables, etc.).

Any suitable indicator (e.g., alphanumeric or other symbols, etc.) may be utilized to indicate the ability or inability to produce a sampling range and/or sampled data set. In addition, any desired data or reference to the data (e.g., address, pointer, data structure, etc.) may be provided for the sampled data set. The full data set may be applied to a column match in the absence of producing a sampled data set for that match. Alternatively, the column match may be discarded in the event data for the match cannot be sampled. Data (e.g., counts, column values, column matches, etc.) may be ordered in any desired fashion (e.g., ascending or descending order, based on any suitable criteria (e.g., selectivity, numeric, lexicographic, etc.), etc.) for determining keys, column matches, sampled data, and/or sampling ranges.

Present invention embodiments may be utilized to determine keys between two or more database tables, where an initial table serves as a primary database table and the remaining database tables serve as foreign database tables. The generated keys may include any quantity of columns from the primary and/or foreign database tables.

The present invention embodiments may employ any number of any type of user interface (e.g., Graphical User Interface (GUI), command-line, prompt, etc.) for obtaining or providing information (e.g., generated keys, parameter values, desired database objects, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., generated keys, parameter values, desired database objects, etc.).

The present invention embodiments are not limited to the specific tasks or algorithms described above, but may be utilized for determining keys between any quantity of any types of database objects.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of determining key relationships between database tables comprising:
    determining a sampling range for one or more matching columns between first and second database tables, wherein the matching columns satisfy one or more matching criteria and the sampling range is defined by minimum and maximum column values and is based on quantities of distinct values within the matching columns, and wherein determining a sampling range includes:
        identifying a median value within a set of ordered column values for the matching columns; and
        assigning consecutive column values from the ordered set less than the median value to the minimum column value and assigning consecutive column values from the ordered set greater than the median value to the maximum column value until the minimum and maximum column values of the sampling range produce a desired size for a sample set;
    sampling data from the first and second database tables with values complying with the minimum and maximum column values of the sampling range for the one or more matching columns to determine the sample set; and
    determining keys between the first and second database tables based on a comparison of matching between columns within the sample set and matching between columns of a full data set of the first and second database tables.

2. The computer-implemented method of claim 1, wherein the matching criteria include at least a hit rate.

3. The computer-implemented method of claim 1, wherein determining keys further includes:
    determining a candidate set of columns from the matching columns based on a comparison of hit rates within a full data set and the sample set; and
    determining a key from the candidate set based on at least a selectivity and hit rate for the candidate set within the sample set.

4. The computer-implemented method of claim 1, further comprising:
    filtering the matching columns based on at least one of selectivity and hit rate.

5. A system for determining key relationships between database tables comprising:
    a computer system including at least one processor configured to:
        determine a sampling range for one or more matching columns between first and second database tables, wherein the matching columns satisfy one or more matching criteria and the sampling range is defined by minimum and maximum column values and is based on quantities of distinct values within the matching columns, and wherein determining a sampling range includes:
            identifying a median value within a set of ordered column values for the matching columns; and
            assigning consecutive column values from the ordered set less than the median value to the minimum column value and assigning consecutive column values from the ordered set greater than the median value to the maximum column value until the minimum and maximum column values of the sampling range produce a desired size for a sample set;
        sample data from the first and second database tables with values complying with the minimum and maximum column values of the sampling range for the one or more matching columns to determine the sample set; and
        determine keys between the first and second database tables based on a comparison of matching between columns within the sample set and matching between columns of a full data set of the first and second database tables.

6. The system of claim 5, wherein the matching criteria include at least a hit rate.

7. The system of claim 5, wherein determining keys further includes:
    determining a candidate set of columns from the matching columns based on a comparison of hit rates within a full data set and the sample set; and
    determining a key from the candidate set based on at least a selectivity and hit rate for the candidate set within the sample set.

8. The system of claim 5, wherein the at least one processor is further configured to:
- filter the matching columns based on at least one of selectivity and hit rate.

9. A computer program product for determining key relationships between database tables comprising:
- a non-transitory computer readable storage medium having computer readable program code embodied therewith, the computer readable program code comprising computer readable program code configured to:
  - determine a sampling range for one or more matching columns between first and second database tables, wherein the matching columns satisfy one or more matching criteria and the sampling range is defined by minimum and maximum column values and is based on quantities of distinct values within the matching columns, and wherein determining a sampling range includes:
    - identifying a median value within a set of ordered column values for the matching columns; and
    - assigning consecutive column values from the ordered set less than the median value to the minimum column value and assigning consecutive column values from the ordered set greater than the median value to the maximum column value until the minimum and maximum column values of the sampling range produce a desired size for a sample set;
  - sample data from the first and second database tables with values complying with the minimum and maximum column values of the sampling range for the one or more matching columns to determine the sample set; and
  - determine keys between the first and second database tables based on a comparison of matching between columns within the sample set and matching between columns of a full data set of the first and second database tables.

10. The computer program product of claim 9, wherein the matching criteria include at least a hit rate.

11. The computer program product of claim 9, wherein determining keys further includes:
- determining a candidate set of columns from the matching columns based on a comparison of hit rates within the full data set and the sample set; and
- determining a key from the candidate set based on at least a selectivity and hit rate for the candidate set within the sample set.

12. The computer program product of claim 9, wherein the computer readable program code further comprises computer readable program code configured to:
- filter the matching columns based on at least one of selectivity and hit rate.

\* \* \* \* \*